United States Patent
Avakian et al.

(10) Patent No.: US 9,926,408 B2
(45) Date of Patent: Mar. 27, 2018

(54) PREPARATION OF IMIDE OLIGOMERS VIA CONCURRENT REACTIVE EXTRUSION

(71) Applicant: PolyOne Corporation, Avon Lake, OH (US)

(72) Inventors: Roger W. Avakian, Solon, OH (US); Ling Hu, Westlake, OH (US)

(73) Assignee: PolyOne Corporation, Avon Lake, OH (US)

( * ) Notice: Subject to any disclaimer, the term of this patent is extended or adjusted under 35 U.S.C. 154(b) by 96 days.

(21) Appl. No.: 15/024,833

(22) PCT Filed: Sep. 24, 2014

(86) PCT No.: PCT/US2014/057115
§ 371 (c)(1),
(2) Date: Mar. 24, 2016

(87) PCT Pub. No.: WO2015/048065
PCT Pub. Date: Apr. 2, 2015

(65) Prior Publication Data
US 2016/0215095 A1 Jul. 28, 2016

Related U.S. Application Data

(60) Provisional application No. 61/882,828, filed on Sep. 26, 2013.

(51) Int. Cl.
| | |
|---|---|
| *C08G 73/10* | (2006.01) |
| *B29C 47/88* | (2006.01) |
| *C08K 3/04* | (2006.01) |
| *C08K 7/06* | (2006.01) |
| *C08L 79/08* | (2006.01) |
| *C08J 5/04* | (2006.01) |
| *C08J 5/24* | (2006.01) |
| *B29C 47/00* | (2006.01) |
| *C09D 179/08* | (2006.01) |

(52) U.S. Cl.
CPC ...... *C08G 73/1067* (2013.01); *B29C 47/0004* (2013.01); *C08G 73/105* (2013.01); *C08G 73/1014* (2013.01); *C08G 73/1028* (2013.01); *C08G 73/1071* (2013.01); *C08J 5/042* (2013.01); *C08J 5/24* (2013.01); *C08K 7/06* (2013.01); *C09D 179/08* (2013.01); *C08J 2379/08* (2013.01)

(58) Field of Classification Search
USPC .......... 524/485; 523/322; 528/289; 264/540
See application file for complete search history.

(56) References Cited

U.S. PATENT DOCUMENTS

| | | |
|---|---|---|
| 4,011,198 A | 3/1977 | Takekoshi et al. |
| 4,294,976 A | 10/1981 | Itatani et al. |
| 5,708,128 A | 1/1998 | Oikawa et al. |
| 5,911,932 A | 6/1999 | Dyksterhouse |
| 5,939,521 A | 8/1999 | Chuang |
| 6,066,710 A | 5/2000 | Becker et al. |
| 6,359,107 B1 | 3/2002 | Connell et al. |
| 6,524,690 B1 | 2/2003 | Dyksterhouse |
| 6,656,316 B1 | 12/2003 | Dyksterhouse |
| 6,784,276 B1 | 8/2004 | Chuang |
| 6,958,192 B2 | 10/2005 | Hergenrother et al. |
| 7,015,304 B1 | 3/2006 | Chuang |
| 7,297,740 B2 | 11/2007 | Dyksterhouse |
| 7,381,849 B1 | 6/2008 | Chuang |
| 7,425,650 B1 | 9/2008 | Chuang |
| 8,093,348 B1 | 1/2012 | Chuang |
| RE43,880 E | 12/2012 | Chuang |
| 8,784,719 B2 | 7/2014 | Lingannaiah et al. |
| 2004/0229014 A1* | 11/2004 | Schulz ............... B29C 59/022 428/141 |
| 2006/0148963 A1* | 7/2006 | Dion .................. B82Y 30/00 524/495 |
| 2009/0242823 A1 | 10/2009 | Kanakarajan et al. |
| 2013/0029154 A1* | 1/2013 | Roach ................. B29B 9/12 428/402 |
| 2014/0135447 A1 | 5/2014 | Golba et al. |
| 2016/0215096 A1 | 7/2016 | Hu et al. |

OTHER PUBLICATIONS

Chuang et al., "Evaluation of RTM370 Polyimide Composites by Resin Film Infusion (RFI)," SAMPE Proceedings, Jun. 2014.
Chuang et al., "Composite Properties of RTM370 Polyimide Fabricated by VARTM," SAMPE, May 2011.
Chuang et al., "Polyimides Based on Asymmetric Dianhydrides (II) (a-Bpda vs a-BTDA) for Resin Transfer Molding RTM)," NASA Technical Reports Server (NTRS), May 2010, Report No. E-17516, pp. 1-12.
Hergenrother et al., "Phenylethynyl Containing Imide Oligomers," Polymer, 2000, vol. 41, No. 13, pp. 5073-5081.
Purushothaman et al., "Effect of Chemical Structure of Aromatic Dianhydrides on the Thermal, Mechanical and Electrical Properties of Their Terpolyimides with 4,4'-Oxydianiline," Journal of Polymer Research, 2011, vol. 818, No. 6, pp. 1597-1604.
Lu et al., "Preparation and Properties of T300 Carbon Fiber-Reinforced Thermoplastic Polyimide Composites," Journal of Applied Polymer Science, 2006, vol. 102, pp. 646-654.
Preparation and properties of T300 carbon fiber reinforced thermoplastic polyimide composites, J. Appl. Polym. Sci., vol. 102, 646-654 (2006).

* cited by examiner

*Primary Examiner* — Tae H Yoon
(74) *Attorney, Agent, or Firm* — John H. Hornickel

(57) ABSTRACT

Reactive extrusion can be used in a continuous, solvent-less preparation of imide oligomers involving two competing reactions among three ingredients, the first reaction between a dianhydride and a diamine and the second reaction between an endcap and the same diamine. The imide oligomer can form a composite via conventional production methods or via formation of a film from imide oligomer re-melted in an extruder before being impregnated into tape or fabric.

17 Claims, 1 Drawing Sheet

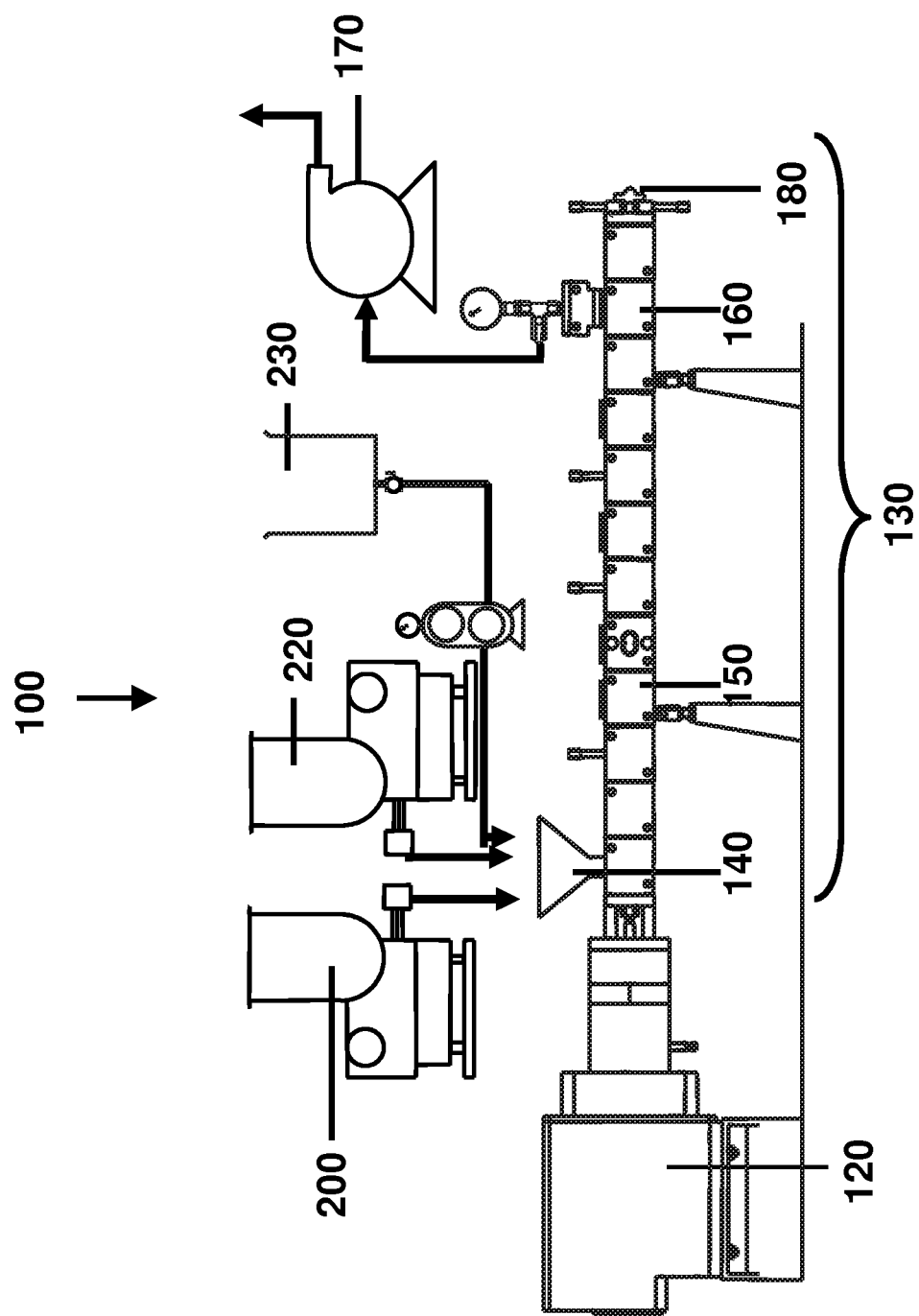

PREPARATION OF IMIDE OLIGOMERS VIA CONCURRENT REACTIVE EXTRUSION

CLAIM OF PRIORITY

This application is a national stage filing under 34 U.S.C. 371 of PCT/US14/57115, filed Sep. 24, 2014, which claims priority from U.S. Provisional Patent Application Ser. No. 61/882,828 and filed on Sep. 26, 2013, which is incorporated by reference.

GOVERNMENT LICENSE RIGHTS

The invention described herein was made in performance of work under NASA Cooperative Agreement No. NNX12AP27A and is subject to the provisions of Section 20135 of the National Aeronautics and Space Act (51 U.S.C. 20135).

SUMMARY OF INVENTION

This invention concerns the production of low-melt viscosity imide oligomers from dianhydrides and diamines via concurrent reactive extrusion.

BACKGROUND OF THE INVENTION

High performance imide polymers are characterized by excellent thermal stability, solvent resistance and high glass transition temperatures (Tg). U.S. Pat. No. 7,015,304 and RE43,880 (both Chuang), the disclosures of which are incorporated by reference, disclose the preparation by a batch process of solvent-free, low-melt imide oligomers and thermosetting polyimides, and to the process of preparing such oligomers and polyimides.

SUMMARY OF THE INVENTION

Unfortunately, preparation of high performance imide polymers are difficult reactions and can benefit from reactive extrusion, a continuous process to form the imide oligomer taught in U.S. Pat. No. 7,015,304 and RE43,880 (both Chuang).

As explained in Chuang, the special feature of the Chuang invention was the novel combination of the reactants comprising dianhydrides selected from the group consisting of 2,3,3',4'-biphenyltetracarboxylic dianhydride (a-BPDA), 2,2',3,3'-biphenyltetracarboxylic dianhydride (s-BPDA), 2,3,3',4'-benzophenone dianhydride (a-BTDA), 3,4'-oxydiphthalic anhydride, 3,4'-methylenediphthalic anhydride, 4,4'-(hexafluoroisopropylidene) diphthalic anhydride (HFDA), 4,4'-oxydiphthalic anhydride, and 3,3'-oxydiphthalic anhydride together with the specific group of diamines and the endcaps that can be melt-processed at temperatures between 232-270° C. (450-520° F.), without any solvent. This reaction produces imide oligomers that have low-melt viscosities of 1-60 poise at 260-280° C. The resulting imide oligomers are amenable to resin transfer molding (RTM), vacuum-assisted resin transfer molding (VARTM) or resin infusion processes at 260-280° C. to produce high quality polymer composites comprising carbon, glass, quartz or synthetic fiber preforms for use at temperatures ranging from about 288-343° C. (550-650° F.).

As further explained in Chuang, a preferred reaction formulation comprised asymmetrical dianhydrides selected from the group consisting of 2,3,3',4'-biphenyldianhydride (a-BPDA), 2,3,3',4'-benzophenone dianhydride (a-BTDA), 3,4'-methylenediphthalic anhydride, and 3,4'-oxydiphthalic anhydride with one or more of the specific diamines and 4-phenylethynylphthalic anhydride (PEPA) or nadic anhydride as the reactive endcap. These compounds could be reacted in the melt to produce imide oligomers that yield a very low viscosity (1-60 poise). This unique melt process, free of solvent, afforded a simple manufacturing advantage in terms of cost saving by not requiring expensive, high boiling solvents such as N-methyl-2-pyrrolidinone (NMP) to dissolve the monomers in order to produce the oligomers followed by a tedious and costly solvent removal process.

In order to produce imide oligomers having the low-melt viscosities, Chuang taught that specific aromatic dianhydrides were selected from the group consisting of 2,3,3',4'-biphenyldianhydride (a-BPDA), 2,3,3',4'-benzophenone dianhydride (a-BTDA), 3,4'-methylenediphthalic anhydride, 3,4'-oxydiphthalic anhydride (a-ODPA), 2,2',3,3'-biphenyldianhydride, 4,4'-(hexafluoroisopropylidene)diphthalic anhydride, 4,4'-oxydiphthalic anhydride, and 3,3'-oxydiphthlic anhydride. Chuang also taught that the specific diamines were selected from the group consisting of diamines containing two benzene rings; such as 3,4'-diamino diphenylmethane, 3,3'-diaminodiphenyl methane, 3,4-diaminobenzophenone, 3,3'-diaminobenzophenone, 3,4'-oxydianiline 2,2'-diamino biphenyl, 2,2'-dimethylbenzidine, 2,2'-bis(trifluoromethyl) benzidine, and diamines containing three benzene rings with linkages between the benzene rings. The linkage between the benzene rings are the same or different and include $CH_2$, $C_2H_4$, oxygen, nil or $C=O$. The amino group on the first benzene ring can be in the para, meta or ortho positions with respect to the linkage Y between the benzene rings while the second amino group on the second benzene ring is preferred to be in the meta or ortho positions with respect to the linkage. In case of three benzene ring diamines, the third benzene ring can be in para, meta or ortho positions.

The novel feature of the Chuang invention was based on the fact that the monomers, namely; the dianhydrides, diamines and the endcaps are melt processable which formed imide oligomers at temperatures ranging between 232-280° C. (450-535° F.) without any solvent. Furthermore, the imide oligomers either partially or fully imidized generally had low-melt viscosities in the range of 1-60 poise. These low-melt imide oligomers could be processed easily by resin transfer molding (RTM), vacuum-assisted resin transfer molding (VARTM) or the resin infusion process with preforms including carbon, glass, quartz or synthetic fibers to produce polyimide matrix composites with 288-343° C. (550-650° F.) high temperature performance capability.

The solvent-free melt-process provides a more consistent quality control in contrast to frequent contamination of high boiling NMP in the final resin product. An example of the solvent-free process is illustrated by the reaction seen at Columns 7 and 8 of U.S. Pat. No. 7,015,304 (Chuang).

However, all examples in Chuang disclosed a batch process in which the reactive endcap of PEPA was melt-processed with the dianhydride and the diamine from the beginning of the process, concurrently with the first contact between the dianhydride and the diamine which were supposed to react. In other words, the diamine reactions sites were in competition between the dianhydride and the endcap from the beginning of the process.

It is believed that reactive extrusion, a continuous reaction process, will result in a more controlled preparation of the low-melt imide oligomers invented by Chuang, while retaining the important features of a solvent-free melt-process preparation asserted by Chuang to be a significant advance in the art.

Controlled preparation of the low-melt imide oligomers invented by Chuang via reactive extrusion was identified in PCT Patent Publication WO 2013/006621 (Golba et al.), in a manner by which the endcap was to be introduced into the extruder at a zone downstream from the throat and the mixing zone of the extruder. The purpose of the later introduction of the endcap was to allow the asymmetric dianhydride to react with the diamine before competition for those diamine reaction sites arose with the arrival of the anhydride endcap into the melt mixture within the extruder.

Unexpectedly, it has been found in the present invention that all ingredients, including the endcap, can be added at the throat of the extruder, establishing the competition for the diamine reaction sites between the dianhydride and the endcap from the beginning of the extrusion process.

One aspect of the present invention is a process for preparing low-melt viscosity imide oligomers derived from a solvent-free reaction of stoichiometric effective amounts of at least one asymmetric dianhydride having the formula:

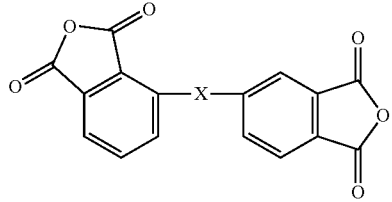

wherein X is selected from the group consisting of nil, C=O, —CH$_2$ and oxygen,
and at least one aromatic diamine having the formula selected from the group consisting of:

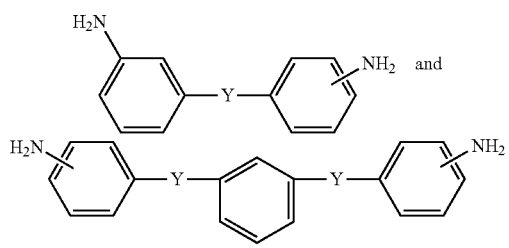

wherein the Y radicals are either the same or different and are selected from the group consisting of nil, CH$_2$, C$_2$H$_4$, C=O, and oxygen,
and an endcap selected from the group consisting of 4-phenylethynylphthalic anhydride and cis-5-norbornene-endo-2,3-dicarboxylic anhydride,
wherein the process comprises the steps of:
(a) introducing the asymmetric dianhydride, the aromatic diamine, and the endcap into an extruder at its throat;
(b) melt mixing the asymmetric dianhydride, the aromatic diamine, and the endcap for a sufficient period of time in at least one mixing zone to thoroughly blend them together and to permit concurrent reaction of both the asymmetric dianhydride and the endcap with the diamine to form the imide oligomer; and
(c) extruding the imide oligomer from the extruder.

Compared with the disclosure of Chuang which teaches solvent-less batch reaction, the reactive extrusion of this invention to form the same oligomer utilizes higher reaction temperatures.

Successful imide oligomers were made using mole ratios of the monomers as follows. For 3,4'-oxydianiline (3,4'-ODA): 2,3,3',4'-biphenyltetracarboxylic dianhydride (a-BPDA):4-phenylethynylphthalic anhydride (4-PEPA), the mole ratio can be 1.0:0.5-0.95:0.10-1.0. Preferably, the mole ratio can be 1.0:0.5:1.

Measured as an average of all heated (eight or nine) reaction zones, it has been found that successful reactive extrusions can use a broader heating profile than that taught by Chuang. Specifically, the average reactive extrusion temperature can range from about 195° C. to about 355° C. and preferably from about 210 to about 350° C., depending on the usage loading of the endcap.

The disclosure of Chuang does not describe reactive extrusion mixing speeds. It has been found that the screw speed in the nine zone reactive extruder used can range from about 100 to about 300 rpm and preferably from about 100 to about 250 rpm, depending on the usage loading of the endcap.

Embodiments of the invention are explained with reference to the drawing.

BRIEF DESCRIPTION OF THE DRAWING

FIG. 1 is a schematic view of the reactive extrusion process of the invention.

EMBODIMENTS OF THE INVENTION

Ingredients for Preparing the Imide Oligomers
Asymmetric Dianhydride
The asymmetric dianhydride has the formula:

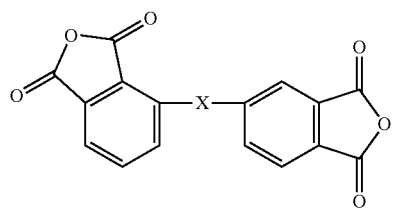

wherein X is selected from the group consisting of nil, C=O, —CH$_2$ and oxygen. Non-limiting examples of the asymmetric dianhydride include 2,3,3',4'-biphenyltetracarboxylic dianydride (a-BPDA), 2,3,3',4-benzophenone dianhydride (a-BTDA), 3,4'-methylene diphthalic anhydride (a-MEDA) or 3,4'-oxydiphthalic anhydride (a-ODPA), or combinations thereof dianhydrides selected from the group consisting of 2,3,3',4'-biphenyldianhydride (a-BPDA); 2,2', 3,3'-biphenyldianhydride; 2,3,3',4'-benzophenone dianhydride (a-BTDA); 3,4'-oxydiphthalic anhydride (a-ODPA); 3,4'-methylenedipthalic anhydride (a-MEDA); 4,4'-hexafluoroisopropylidene diphthalic anhydride (HFDA), 4,4'-oxydiphthalic anhydride; 3,3'-oxydiphthalic anhydride; and combinations thereof.

Diamine
The diamine can be at least one aromatic diamine having the formula selected from the group consisting of:

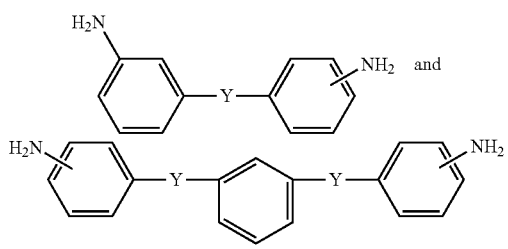

wherein the Y radicals are either the same or different and are selected from the group consisting of nil, $CH_2$, $C_2H_4$, C=O, and oxygen.

The diamine is subjected to end-capping to minimize over-reaction of the dianhydride with the diamine.

Endcap

The endcap is selected from the group consisting of 4-phenylethynylphthalic anhydride (PEPA), cis-5-norbornene-endo-2,3-dicarboxylic anhydride, and combinations thereof.

Optional Additives

As reported by Chuang, optionally, additives can be mixed with the imide oligomer. Non-limited examples of additives are selected from the group consisting of 4-phenylethynyldiphenyl methane and diphenylacetylene, and combinations of them. These additives can be added over the stoichimometric equivalents of the diamine and dianhydride to increase the glass transition temperature and thermo-oxidation of thermoset polyimide resins prepared from the imide oligomer.

Concurrent Reactive Extrusion

Significant to the invention is the contact of the endcap with the diamine concurrent with the contact of the dianhydride with the diamine, in order to establish a competition for diamine reaction sites as soon as melting has commenced in the upstream zones of an extruder. The melt-mixing of the dianhydride and the diamine can result in suitable reaction, even while the endcap is also competing for reaction in the extruder.

FIG. 1 provides a schematic view of the reactive extrusion method useful for the imide oligomer The process can be based on the use of an extruder 100 having a source of power 120 and a series of heated zones 130 through which ingredients travel in a molten state. The extruder can be a twin screw extruder, either co-rotating or counter-rotating and have a screw diameter ranging from 16 mm to 45 mm.

The series of heated zones 130 can number more than six and usually eight or nine, allowing the establishment of different temperatures associated with different segments of screws (not shown) propelling the molten ingredients through the extruder and encountering other ingredients in conditions ripe for planned reaction. FIG. 1 shows twelve zones 130 for extruder 100.

Among the series of zones is a first unheated or cooled zone or throat 140 of the extruder, into which all of the ingredients are added. Melt-mixing and planned reaction begins by zone 150, until an evacuation zone 160 is reached further downstream. Zone 160 can be connected to a source of vacuum power 170 to vent any volatiles, such as water or steam. The melted, mixed, and reacted product of the extruder 100 is extruded through a die 180, for further processing such as pelletizing for later melt-mixing or reaction.

In the present invention, the reactive extruder 100 can be configured to have a first feeder 200, a second feeder 220, and a third feeder 230 to introduce the dianhydride, the diamine, and the endcap, respectively, into the throat 140, commencing the journey through the extruder in which the early or upstream zones are heated to both melt all ingredients and to facilitate a reaction among them.

At the throat, the endcap can be introduced even before the dianhydride and the diamine to have begun reacting. The endcap can be a solid or a liquid, preferably, the latter to assist in the competition of reacting with the diamine while the dianhydride also is reacting with the diamine.

In this invention, each of the zones of the reactive extruder can be heated to a temperature within that range. Conventionally, the temperature remains the same or increases for the sequential zones, until the die zone 180, at which the same or slightly lower temperature prepares the extrudate for exit from the extruder and cooling into strands, pellets, etc.

The average reactive extrusion temperature, (eight or nine heated zones as demonstrated in the Examples below), can range from about 195° to about 355° C., unexpectedly a wider range of temperatures than that reported by Chuang. Moreover, within the average temperature, each of the zones can have a different temperature. Generally, the temperature does not decrease as the melted monomers move from zone to zone. The lowest temperature as reported in the Examples is not heated at the zone, while the highest temperature is 380° C. in the last heated zone before the die, depending on the usage loading of 4-PEPA endcap.

The invention, via the Examples, has also demonstrated acceptable screw rotation revolutions per minute to establish the time of transit through each zone of the extruder 100, which can be a factor in the kinetics of the reactive extrusion planned for the dianhydride and diamine in the concurrent presence of the reactive endcap during their entire residence in the extruder. The screw speed can range in the nine zone reactive extruder from about 100 to about 1000 rpm and preferably about 100 to 300 rpm for a 16 mm (L/D=40) extruder. The total residence time, or duration of the melt mixing step in the process, therefore can range from about 20 to about 2000 seconds, desirably from about 25 to about 200 seconds for a 16 mm (L/D=40) extruder, and preferably from about 100 to about 150 seconds for a 16 mm (L/D=40) extruder. Using the indexing to a 16 mm (L/D=40) extruder, one having ordinary skill in the art can scale up or scale down to other types of extruders without departing from the scope of the invention.

Significant to this invention is the unexpected successful competition of endcap with dianhydride for diamine reaction sites, within appropriate stoichiometric ranges to complete the competing reactions and establish a fully reacted oligomer without undue quantities of unreacted monomers.

Imide oligomers produced by the reactive extrusion process are found to have an uncured glass-transition temperature of about 152-264° C. and a cured glass-transition temperature of 288°-340° C.

Usefulness of the Invention

A better controlled, solventless, continuous reactive extrusion to form imide oligomers disclosed by Chuang, could make the imide oligomers more cost effective for the preparation of composites of the imide oligomer and other ingredients, including the optional additives listed above.

The imide oligomer formed by the concurrent reactive extrusion process of this invention can be further reacted or cured alone or in the presence of fiber at temperatures ranging from about 340° to 360° c. to obtain a thermosetting polyimide matrix-composite having a Tg ranging from about 300°-370° C. The fiber can be carbon, glass, or synthetic fiber. The means of curing can be a resin-transfer molding process or selective laser sintering.

Composites so formed can be used in a number of high performance articles, such as lightweight polymer composites (e.g., airframe and engine components); military and commercial aircraft; missiles, radomes, and rockets, etc.; high temperature laminates; electrical transformers; bushings/bearings for engines; oil drilling equipment; oil drilling risers; automotive chassis bearings; and films for use in electronics, fuel cells and batteries.

One embodiment of forming a composite from imide oligomer solves problems with the production of polyimide prepregs or preforms.

This conventional production currently relies on the melting of solid resins in heated feed tanks, transfer of the melt to a three-roll mill type feeding system, production of a thin film on a roller, and then transfer of the film to a uni-dimensional tape or a fabric which can be made of carbon fibers, fiberglass, and polymers, such as Kevlar™ brand polymer, or combinations of them. This conventional production requires that these imide oligomeric thermoset resins be stored at elevated temperatures for long periods of time in the heated feed tanks, which can allow those resins to begin their cross-linking chemical reactions before being rolled into films for laminated composite construction.

At best, it is estimated that the current production method allows only for a short "pot life" of one to two hours for those resins in the heated tanks before they need to be discarded as no longer reliable or viable reactive polymer systems.

The new production of composites begins with the solvent-less reactive extrusion process described above, which has resulted in polyimide oligomers in the form of dry powders, pellets, filaments, films, etc. The production utilizes powder or pellets of the imide oligomer to be fed as solid articles into a single screw extruder with an appropriate film or sheet extrusion die and operating at temperatures above the melting point of the imide oligomer. The extruder would rapidly melt the dry oligomer to produce a thin film emerging from the die, which would then be fed directly into the prepreg or preform machine for impregnation into the tape or fabric, such machine as described in U.S. Pat. No. 7,297,740 (Dyksterhouse).

The use of an extruder to re-melt the powder or pellets of imide oligomer dramatically reduces the time during which those imide oligomer resins are exposed to elevated temperatures. It is probable that the total time from feeding of powder or pellets into the extruder to impregnation into the uni-dimensional tape or fabric will be only a few minutes, during which time the imide oligomer will have a very limited chance to react inadvertently until the time is proper in the prepreg machine.

It is also possible, as shown by Examples below, to include fiber as additives in the reactive extrusion to form the imide oligomer composites.

It is also possible for the oligomerization of the imide to be extruded using a sheet or film die in the melt form directly onto fibers (woven or nonwoven) for cooling and subsequent curing.

Table 1 shows acceptable, desirable, and preferable ranges of monomers useful in the present invention, all expressed in mole percent (mole. %) of the entire compound. The polyimide can comprise, consist essentially of, or consist of these monomers. The monomers can be introduced separately into the throat of the extruder as seen in FIG. 1 or pre-blended before addition via a single feeder.

TABLE 1

| Mole % | Acceptable | Desirable | Preferable |
|---|---|---|---|
| Asymmetric Dianhydride | 15-49 | 20-46 | 20-30 |
| Diamine | 38-50 | 40-50 | 40-44 |
| Endcap | 2.5-40 | 5-40 | 26-40 |
| Optional Other Ingredients | 0-15 | 0 | 0 |

Examples further explain the invention.

EXAMPLES

Comparative Example A and Examples 1-17

Table 2 shows the list of ingredients. Tables 3 and 4 show the recipes, the reaction conditions, and the test results.

TABLE 2

| Brand Name | Ingredient and Purpose | Commercial Source |
|---|---|---|
| 3,4' ODA | 3,4'-oxydianiline, Mw = 200.24, Tm = 74~75° C. | Miki Sangyo (USA) Inc |
| a-BPDA | 2,3,3',4'-Biphenyltetracarboxylic dianhydride, CAS No. 36978-41-3 Mw = 294.21, Tm = 196 to 197° C. | Miki Sangyo (USA) Inc |
| 4-PEPA | 4-phenylethynylphthalic anhydride, CAS No. 119389-05-8, Mw = 248.24, Tm = 152.0° C. | Changzhou Sunlight Pharmaceutical Co., Ltd. China for Examples 1-3; Miki Sangyo (USA) Inc for Examples 4-6; Nexam, Sweden for all others |

To cure the crosslinkable polyimide oligomers made via reactive extrusion, 10 grams of each Example was cured at 360° C. in a Phoenix Airwave Microwave Ash Oven for 5 hours, followed by cooling to room temperature to be ready for characterization of the polymer by differential scanning calorimetry (DSC).

DSC was utilized to determine glass transition temperature and thermal stability. The samples were analyzed using a TA Instruments model DSC Q20. The specimens were exposed to a heat-cool-heat cycle in the analysis. From Examples 1 to 17, for uncured resin, the temperature range of each segment was from 20° C. to 350° C. at heating/cooling rates of 10° C./minute. For all other Examples, for uncured resin, the temperature range of each segment was from 20° C. to 250° C. at heating/cooling rates of 10° C./minute. For all Examples, for the cured resin, the temperature range of each segment was from 20° C. to 400° C. at heating/cooling rates of 10° C./minute. A nitrogen gas purge of 50 ml/minute was used. The glass transition temperature (Tg) of the sample was determined using the half-height from the data recorded in the second heating segment of the analysis.

All molecular weights were measured by Gel Permeation Chromatography (GPC) (Viscotek Model 302 TDAmax) attached with three detectors, i.e. Refractive Index, Light Scattering (RALS+LALS) and viscosity). Dimethylformamide (DMF) with 0.05M lithium bromide (LiBr) was used as a solvent. The molecular weight values were determined by Right Angle (90°) Light Scattering Detector, and NIST-traceable polymethylmethacrylate (PMMA) was used as standard. Around 30 mg of each sample tested was added into 6 mL of DMF +0.05M LiBr. The solution was then shaken for 20 hours on an orbital shaker followed by heating to 50° C. for 2 hours, and filtering through 0.22 um polytetrafluoroethylene filter before being injected to the GPC column for testing.

TABLE 3

| | Example | | | | | | | | |
|---|---|---|---|---|---|---|---|---|---|
| | 1 | 2 | 3 | 4 | 5 | 6 | 7 | 8 | 9 |
| Mole Ratio of 3,4'-ODA:a-BPDA:4-PEPA End-cap | 1:0.5:1.0 | 1:0.5:1.0 | 1:0.5:1.0 | 1:0.5:1.0 | | | 1:0.5:1.0 | | 1:0.85:0.3 |
| Monomer (mole. %) | | | | | | | | | |
| 3,4'-ODA | 40.00 | 40.00 | 40.00 | 40.00 | | | 40.00 | | 46.51 |
| a-BPDA | 20.00 | 20.00 | 20.00 | 20.00 | | | 20.00 | | 39.53 |
| 4-PEPA | 40.00 | 40.00 | 40.00 | 40.00 | | | 40.00 | | 13.95 |
| Extruder | Prism 16 millimeter Twin Screw Extruder (L/D = 40) | | | | | | | | |
| Order of addition | All ingredients were mixed in a blender and then added at the throat of the extruder | | | | | | | | |
| Temperature at different zone, ° C. | | | | | | | | | |
| Zone 1 | n/a | n/a | n/a | n/a | n/a | n/a | n/a | n/a | 280 |
| Zone 2 | 100 | 100 | 100 | 100 | 100 | 100 | 100 | 100 | 280 |
| Zone 3 | 210 | 210 | 210 | 210 | 210 | 210 | 210 | 210 | 320 |
| Zone 4 | 210 | 210 | 210 | 210 | 210 | 210 | 210 | 210 | 320 |
| Zone 5 | 210 | 210 | 210 | 210 | 210 | 210 | 230 | 230 | 350 |
| Zone 6 | 210 | 210 | 210 | 210 | 210 | 210 | 230 | 230 | 350 |
| Zone 7 | 210 | 210 | 210 | 210 | 210 | 210 | 250 | 250 | 350 |
| Zone 8 (vacuum port) | 210 | 210 | 210 | 210 | 210 | 210 | 250 | 250 | 350 |
| Zone 9 | 210 | 210 | 210 | 210 | 210 | 210 | 250 | 250 | 350 |
| Ave. Temp. ° C. | 196 | 196 | 196 | 196 | 196 | 196 | 216 | 216 | 328 |
| Die | No Die | 220 | 210 | 210 | 210 | 210 | 210 | 210 | 340 |
| Screw rpm | 250 | 250 | 250 | 100 | 150 | 200 | 100 | 150 | 300 |
| Observation at Die | molten light caramel | molten light caramel | molten light caramel | molten light caramel | | | molten light caramel | | molten light caramel |
| Tg of uncured resin measured by DSC, ° C. (room temp to 360° C.) | 152.6 | | 150.8 | 154.7 | 152.4 | 152 | | | 220.8 |
| Tg of the cured resin by DSC (room temp to 400° C.) | | | | 339.3 | | | | | 292.9 |
| Mn by GPC | | | | 1385 | | | | | |
| Mw by GPC | | | | 1694 | | | | | |
| Mw/Mn | | | | 1.223 | | | | | |

TABLE 4

| | Example | | | | | | | | |
|---|---|---|---|---|---|---|---|---|---|
| | 10 | 11 | 12 | 13 | A | 14 | 15 | 16 | 17 |
| Mole Ratio of 3,4'-ODA:a-BPDA:4-PEPA End-cap | 1:0.88:0.24 | 1:0.9:0.2 | 1:0.935:0.13 | 1:0.95:0.1 | 1:0.975:0.05 | 1:0.56:0.88 | 1:0.6:0.8 | 1:0.7:0.6 | 1:0.8:0.4 |
| Monomers (mole. %) | | | | | | | | | |
| 3,4'-ODA | 47.17 | 47.62 | 48.43 | 48.78 | 49.38 | 40.98 | 41.67 | 43.48 | 45.45 |
| a-BPDA | 41.51 | 42.86 | 45.28 | 46.34 | 48.15 | 22.95 | 25.00 | 30.43 | 36.36 |
| 4-PEPA* | 11.32 | 9.52 | 6.30 | 4.88 | 2.47 | 36.07 | 33.33 | 26.09 | 18.18 |
| Extruder | Prism 16 millimeter Twin Screw Extruder (L/D = 40) | | | | | | | | |
| Order of addition | All ingredients were mixed in a blender and then added at the throat of the extruder | | | | | | | | |
| Temperature at different zone, ° C. | | | | | | | | | |
| Zone 1 | 280 | 280 | 320 | 320 | 350 | n/a | n/a | n/a | 250 |
| Zone 2 | 280 | 280 | 320 | 320 | 350 | 100 | 100 | 100 | 250 |
| Zone 3 | 320 | 320 | 350 | 350 | 370 | 210 | 210 | 210 | 250 |
| Zone 4 | 320 | 320 | 350 | 350 | 370 | 210 | 210 | 210 | 270 |
| Zone 5 | 350 | 350 | 350 | 350 | 370 | 230 | 230 | 230 | 270 |

TABLE 4-continued

| | Example | | | | | | | | |
|---|---|---|---|---|---|---|---|---|---|
| | 10 | 11 | 12 | 13 | A | 14 | 15 | 16 | 17 |
| Zone 6 | 350 | 350 | 370 | 370 | 370 | 230 | 230 | 230 | 270 |
| Zone 7 | 350 | 350 | 370 | 370 | 370 | 230 | 230 | 230 | 270 |
| Zone 8 (vacuum port) | 350 | 350 | 370 | 370 | 370 | 230 | 230 | 230 | 270 |
| Zone 9 | 350 | 350 | 380 | 380 | 380 | 230 | 230 | 230 | 270 |
| Ave. Temp. ° C. | 328 | 328 | 353 | 353 | 367 | 209 | 209 | 209 | 263 |
| Die | 340 | 340 | 380 | 380 | 380 | 230 | 230 | 230 | 250 |
| Screw rpm | 300 | 300 | 250 | 250 | 250 | 100 | 100 | 150 | 150 |
| Observation at Die | molten light caramel | molten light caarmel | molten light caramel | molten light caramel | not able to run | molten light caramel | molten light caramel | molten light caramel | molten light caramel |
| Tg of uncured resin measured by DSC, ° C. (room temp to 350° C.) | 235.3 | 240.2 | 256.1 | 262.7~263.6 | | 156.6 | 164 | 174.3 | 201.1 |
| Tg of the cured resin by DSC (room temp to 400° C.) | 287.4 | 289 | 289.8 | 293.1 | n/a | 319.7 | 329.2 | 293.3 | 299.3 |
| Mn by GPC | | 5312 | | 9589 | | | | | |
| Mw by GPC | | 9106 | | 16382 | | | | | |
| Mw/Mn | | 1.714 | | 1.709 | | | | | |

Fourier Transform Infrared Spectroscopy (FTIR) was utilized to identify chemical structures for polyimide, cyclic anhydride, and amine. The characteristic absorption peaks of cyclic anhydride were observed at ~1820 cm$^{-1}$ of medium intensity and ~1780 cm$^{-1}$ of strong intensity, respectively, assigned to C═O symmetric and asymmetric stretch peaks. For polyimide, the characteristic absorption peaks are observed at ~1780 cm$^{-1}$ with medium intensity and ~1720 cm$^{-1}$ of very strong intensity with respective to C═O asymmetric and symmetric stretch, and also at ~1380 cm$^{-1}$ of strong intensity due to imide C—N stretch. Although the anhydride asymmetric C═O absorption peak at ~1780 cm$^{-1}$ is in overlap with the imide symmetric C═O absorption peak at ~1780 cm$^{-1}$, the anhydride symmetric C═O absorption peak at ~1820 cm$^{-1}$ can be used to identify un-reacted anhydride. For diamine, two absorption peaks with very weak intensity are observed at ~3200 cm$^{-1}$ due to NH symmetric and asymmetric stretching. In addition, for the 4-PEPA endcap, besides two C═O absorption stretching peaks at ~1820 and ~1780 cm$^{-1}$, there is another characteristic absorption peak at 2210 cm$^{-1}$ which is assigned to the stretching of ethynyl group (—C≡C—).

FTIR spectra of Examples 1 to 3 showed the asymmetric and symmetric C═O stretching absorption peaks at ~1780 and ~1720 cm$^{-1}$, and the C—N stretching absorption peak at ~1380 cm$^{-1}$ which are assigned to the imide groups. A very tiny symmetric C═O absorption peak at ~1820 cm$^{-1}$ assigned to un-reacted anhydride was observed for Examples 1 to 3, which indicated that the Examples 1 to 3 contained a very small amount of unreacted anhydride. In addition, compared with the non-reacted mixture, little change in intensity of ethynyl group (—C≡C—) stretching absorption peak at 2210 cm$^{-1}$ was observed for Examples 1 to 3, indicating that the reactive functional group (—C≡C—) was not diminished during extrusion.

FTIR spectra of Examples 4 to 6 showed the asymmetric and symmetric C═O stretching absorption peaks at ~1780 and ~1720 cm$^{-1}$, and the C—N stretching absorption peak at ~1380 cm$^{-1}$ which are assigned to the imide groups. In addition, compared with the non-reacted mixture, little change in intensity of ethynyl group (—C≡C—) stretching absorption peak at 2210 cm$^{-1}$ was observed for Examples 4 to 6, indicating that the reactive functional group (—C≡C—) was not diminished during extrusion. However, in comparison, Example 4 was the best material because no symmetric C═O absorption peak at ~1820 cm$^{-1}$ assigned to unreacted anhydride was observed for Example 4, but a very tiny symmetric C═O absorption peak at ~1820 cm$^{-1}$ assigned to un-reacted anhydride was observed for Examples 5 and 6.

FTIR spectra of Examples 7 and 8 showed the asymmetric and symmetric C═O stretching absorption peaks at ~1780 and ~1720 cm$^{-1}$, and the C—N stretching absorption peak at ~1380 cm$^{-1}$ which are assigned to the imide groups. In addition, compared with the non-reacted mixture, little change in intensity of ethynyl group (—C≡C—) stretching absorption peak at 2210 cm$^{-1}$ was observed for Examples 7 and 8, indicating that the reactive functional group (—C≡C—) was not diminished during extrusion. To compare with Example 4, a very tiny symmetric C═O absorption peak at ~1820 cm$^{-1}$ assigned to unreacted anhydride was also observed for Examples 7 to 8.

Examples 1-3 started with a screw speed of 250 rpm in the 16 mm (L/D=40) extruder. Examples 4-6 then tried a slower screw speed of 100, 150, and 200 rpm to increase residence time relative to Examples 1-3. Examples 7 and 8 then tried both a slower screw speed of 100 and 150 rpm, respectively, and a higher average temperature to increase both residence time and heat of reaction relative to Examples 1-3. Examples 9-13 increased the average temperature over Examples 1-8 but at faster screw speeds, again testing the time and temperature variables for concurrent reactive extrusion, indexed to a 16 mm, L/D=40 extruder. Comparative Example A did not succeed because the temperatures in the zones of the extruder were too high. Examples 14-17 returned to the lower temperatures and slower screw speeds, with success.

These Examples 1-17 show that one having ordinary skill in the art can establish time and temperature parameters for a given molecular weight for a given size of extruder of a given length/diameter ratio for that extruder. As one moves the process of the invention to extruders of other sizes or oligomers of different molecular weights, the integral of the time and temperature will need adjustment to the new extruder conditions and/or desired molecular weight. Thus, for purposes of this invention, the residence time and the temperatures of the zones are indexed against the only extruder used in these Examples, stated above, meaning that such person having ordinary in the art can alter time and temperature settings for extruders of other sizes, desired other molecular weights, or both, without departing from the scope of the present invention.

Examples 18-20 and Comparative Examples B & C

To demonstrate the utility of the imide oligomer being able to make fibrous composites, using both carbon fiber and carbon nanofiber, and with the former, using an in-situ polymerization process. Tables 5 and 6 show the formulations, extruder conditions, and test results.

TABLE 5

| | Example | | | | |
|---|---|---|---|---|---|
| | 18 | 19 | 20 | B | C |
| Mole ratio of 3,4'-ODA:a-BPDA:End-cap Monomers | 1:0.5:1.0 | 1:0.5:1.0 | 1:0.5:1.0 | 1:0.5:1.0 | 1:0.5:1.0 |
| 3,4'-ODA, wt % | 41.68 | 37.51 | | 37.51 | 33.34 |
| a-BPDA, wt % | 33.62 | 30.26 | | 30.26 | 26.90 |
| 4-PEPA, wt % | 24.70 | 22.23 | | 22.23 | 19.76 |
| Chopped Carbon Fiber, Fortafil 201CF, from Fortafil Fibers, Inc., wt % | | 10 | 10 | | |
| Carbon Nanofiber, Pyrograf III carbon nanofiber, LHT Grade PR-24-XT-LHT from Applied Sciences | | | | 10 | 20 |
| Example 18, wt % | | | 90 | | |
| Extruder | Prism 16 millimeter Twin Screw Extruder (L/D = 40) | | | | |
| Order of Addition | All ingredients added at throat | | | | |
| Temperature at different zone, ° C. | | | | | |
| Zone 1 | n/a | n/a | n/a | n/a | n/a |
| Zone 2 | 100 | 100 | 100 | 100 | 100 |
| Zone 3 | 210 | 210 | 210 | 210 | 210 |
| Zone 4 | 210 | 210 | 210 | 210 | 210 |
| Zone 5 | 210 | 210 | 210 | 210 | 210 |
| Zone 6 | 210 | 210 | 210 | 210 | 210 |
| Zone 7 | 210 | 210 | 210 | 210 | 210 |
| Zone 8 (vacuum port) | 210 | 210 | 210 | 210 | 210 |
| Zone 9 | 210 | 210 | 210 | 210 | 210 |
| Die | 210 | 210 | 210 | 210 | 210 |
| Screw rpm | 150 | 150 | 150~200 | 150 | 150 |
| Observation at Die | molten material | black molten material with higher torque than Example 18 | black molten material with higher torque than Example 19 | not successful | |
| Tg of uncured resin measured by DSC, ° C. (20 to 250° C.) | 138.6 | 138.3 | 142.2 | not tested | not tested |
| Tg of the cured resin by DSC | 334.3 | 334.3 | 337.3 | not tested | not tested |

TABLE 6

| | Example | | | | | |
|---|---|---|---|---|---|---|
| | 21 | 22 | 23 | 24 | 25 | 26 |
| Mole ratio of 3,4'-ODA:a-BPDA:End-cap Monomers | 1:0.5:1.0 | 1:0.5:1.0 | 1:0.5:1.0 | 1:0.5:1.0 | 1:0.5:1.0 | 1:0.5:1.0 |
| 3,4'-ODA, wt % | 41.68 | | | | | |
| a-BPDA, wt % | 33.62 | | | | | |
| 4-PEPA, wt % | 24.70 | | | | | |
| Chopped Carbon Fiber, Fortafil 201CF, from Fortafil Fibers, Inc., wt % | | | | | 50 | |
| Carbon Nanofiber, Pyrograf III carbon nanofiber, LHT Grade PR-24-XT-LHT from Applied Sciences, wt % | | 5 | 10 | 20 | | 50 |
| Example 21, wt % | | 95 | 90 | 80 | 50 | 50 |
| Extruder | Prism 16 millimeter Twin Screw Extruder (L/D = 40) | | | | | |
| Order of Addition | All ingredients added at throat | | | | | |

TABLE 6-continued

| | Example | | | | | |
|---|---|---|---|---|---|---|
| | 21 | 22 | 23 | 24 | 25 | 26 |
| Temperature at different zone, ° C. | | | | | | |
| Zone 1 | n/a | n/a | n/a | n/a | n/a | n/a |
| Zone 2 | 100 | 100 | 100 | 100 | 150 | 150 |
| Zone 3 | 210 | 210 | 210 | 210 | 230 | 230 |
| Zone 4 | 210 | 210 | 210 | 210 | 230 | 230 |
| Zone 5 | 210 | 210 | 210 | 210 | 250 | 250 |
| Zone 6 | 210 | 210 | 210 | 210 | 250 | 250 |
| Zone 7 | 210 | 210 | 210 | 210 | 250 | 250 |
| Zone 8 (vacuum port) | 210 | 210 | 210 | 210 | 250 | 250 |
| Zone 9 | 210 | 210 | 210 | 210 | 250 | 250 |
| Die | 210 | 210 | 210 | 230 | 230 | 230 |
| Screw rpm | 150 | 250 | 250 | 300 | 300 | 300 |
| Observation at Die | molten material | black molten material with higher torque than Example 21 | black molten material with higher torque than Example 21 | black molten material with higher torque than Example 21 | black molten material with higher torque than Example 24 | black molten material with a much higher torque than Example 24 |
| Tg of uncured resin measured by DSC, ° C. (room temp to 250° C.) | 138.5 | 138.8 | 144.2 | 143.9 | 142.6 | 146.4 |
| Tg of the cured resin by DSC (° C.) | 338.7 | 338.0 | 335.9 | Not detected below 400 ° C., means Tg > 400° C. | 337.6 but not very clear | 336.7-340.6 but not very clear |

Examples 18 and 21 are further demonstrations of successful reaction via concurrent reactive extrusion to form imide oligomers useful for curing into thermoset polyimides with and without the presence of fibrous additives such as carbon fiber and carbon nanofiber.

Examples 19 and 20 demonstrate that it is possible to form a curable imide oligomer composite both via in-situ polymerization in the presence of carbon fiber and in a two step process of oligomerization followed by melt mixing with the carbon fiber. Comparative Examples B and C demonstrate that in-situ polymerization of the imide oligomer in the presence of carbon nanofiber is not presently possible using known reaction conditions.

Examples 22-26 demonstrate that using a variety of zone temperatures and screw speeds can be employed in a melt mixing of imide oligomer and carbon fiber and carbon nanofiber.

Most unexpectedly, there is a greatly increased Tg for the compound having about 20 weight percent of the carbon nanofiber, more than the measuring capacity of 400° C. This peak of Tg, more than a 19% increase in Tg as compared with the compound having about 10 weight percent of the carbon nanofiber, is not understood but can prove valuable for those seeking to form aromatic polyimide-carbon nanofiber composites of all types as identified above. The weight percent of carbon nanofiber can range from about 17 to about 23, and preferably from about 18 to about 22 weight percent of the compound.

The invention is not limited to above embodiments. The claims follow.

What is claimed is:

1. A process for preparing low-melt viscosity imide oligomers derived from a solvent-free reaction of stoichiometric effective amounts of at least one asymmetric dianhydride having the formula:

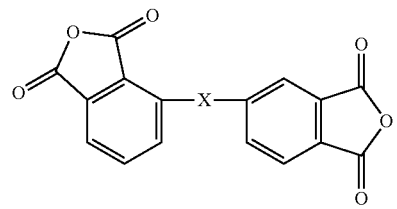

wherein X is selected from the group consisting of nil, C=O, —CH2 and oxygen,
and at least one aromatic diamine having the formula selected from the group consisting of:

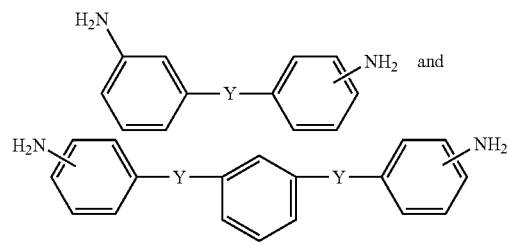

wherein the Y radicals are either the same or different and are selected from the group consisting of nil, CH2, C2H4, C=O, and oxygen,
and an endcap selected from the group consisting of 4-phenylethynylphthalic anhydride and cis-5-norbornene-endo-2,3-dicarboxylic anhydride,
wherein the process comprises the steps of:
(a) introducing the asymmetric dianhydride, the aromatic diamine, and the endcap into an extruder at its throat;
(b) melt mixing the asymmetric dianhydride, the aromatic diamine, and the endcap for a sufficient period of residence time in at least one mixing zone having at least one temperature to thoroughly blend them together and to permit concurrent reaction of both the asymmetric dianhydride and the endcap with the diamine to form the imide oligomer;

(c) extruding the imide oligomer from the extruder;

(d) melt mixing the imide oligomer in the presence of carbon nanofiber to form a fiber reinforced imide oligomer compound having about 17 to about 23 weight percent of carbon nanofiber;

(e) extruding the fiber reinforced imide oligomer compound; and (f) feeding the fiber reinforced imide oligomer compound into a machine for impregnation into a tape or fabric.

2. The process of claim 1, wherein the temperature in the extruder ranges from about 210° to about 380° C. in an extruder of at least six zones.

3. The process of claim 1, wherein the melt mixing step (b) has a residence time of about 20 to about 2000 seconds.

4. The process of claim 1, wherein the melt mixing step (b) has a residence time of about 25 to about 200 seconds indexed to a 16 mm, L/D=40 extruder.

5. The process of claim 1, wherein step (e) results in pelletization before step (f).

6. The process of claim 1, wherein the endcap introduced during step (a) competes and denies reaction sites at the aromatic diamine for reaction by the dianhydride.

7. The process of claim 1, wherein introduction of the endcap of the extruder during step (a) establishes competition for diamine reaction sites between the dianhydride and the endcap from the beginning of the extrusion process.

8. The process of claim 1, wherein the melt mixing step (b) has a screw speed of from about 100 to about 1000 revolutions per minute.

9. The process of claim 8, wherein the melt mixing step (b) has a screw speed of from about 100 to about 300 revolutions per minute indexed to a 16 mm, L/D=40 extruder.

10. The process of claim 1, wherein the endcap is a solid or a liquid, and wherein the process is solvent-less.

11. The process of claim 1, wherein the introduction of the endcap during step (a) does not cause immediate cessation of reaction of the dianhydride and the diamine which have also begun reacting during step (a).

12. The process of claim 1, wherein the imide oligomer further comprises optional additives selected from the group consisting of 4-phenylethynyldiphenyl methane and diphenylacetylene, and combinations of them.

13. The process of claim 1, wherein the tape or fabric comprises carbon fibers, fiberglass, polymers, or combinations of them.

14. A composite formed from the fiber reinforced imide oligomer compound made by the process of claim 1.

15. The composite of claim 14, wherein the fiber reinforced imide oligomer compound is further reacted or cured at temperatures ranging from about 340° to 360° C. to form a thermosetting polyimide matrix-composite having a Tg greater than 400° C.

16. The composite of claim 15, wherein the carbon nanofiber is present in amount of about 18 to about 22 weight percent of the fiber reinforced imide oligomer compound.

17. The composite of claim 14, wherein the composite is in the form of an article selected from the group consisting of an airframe component; an engine component; an aircraft; a missile; a radome; a rocket, a high temperature laminate; an electrical transformer; an engine bushing; an engine bearing; oil drilling equipment; oil drilling risers; automotive chassis bearings; and films for use in electronics, fuel cells and batteries.

* * * * *